United States Patent
McNair et al.

(10) Patent No.: US 10,284,650 B2
(45) Date of Patent: May 7, 2019

(54) METHOD AND SYSTEM FOR DYNAMIC HANDLING IN REAL TIME OF DATA STREAMS WITH VARIABLE AND UNPREDICTABLE BEHAVIOR

(71) Applicant: Tektronix Texas, LLC, Westford, MA (US)

(72) Inventors: Eric C. McNair, Rowlett, TX (US); Ryan L. Pipkin, Prosper, TX (US); Adrian C. Soncodi, Plano, TX (US)

(73) Assignee: NetScout Systems Texas, LLC, Westford, MA (US)

( * ) Notice: Subject to any disclaimer, the term of this patent is extended or adjusted under 35 U.S.C. 154(b) by 218 days.

(21) Appl. No.: 15/189,782

(22) Filed: Jun. 22, 2016

(65) Prior Publication Data
US 2017/0374147 A1    Dec. 28, 2017

(51) Int. Cl.
G06F 15/173    (2006.01)
H04L 29/08     (2006.01)
H04L 12/24     (2006.01)

(52) U.S. Cl.
CPC ...... *H04L 67/1097* (2013.01); *H04L 41/0654* (2013.01); *H04L 41/0896* (2013.01); *H04L 41/0893* (2013.01)

(58) Field of Classification Search
USPC ........................................... 709/224
See application file for complete search history.

(56) References Cited

U.S. PATENT DOCUMENTS

| | | | | |
|---|---|---|---|---|
| 2010/0106933 | A1* | 4/2010 | Kamila | G06F 3/0605 711/171 |
| 2011/0302301 | A1* | 12/2011 | Lowes | G06F 9/5083 709/224 |

* cited by examiner

*Primary Examiner* — Hee Soo Kim
(74) *Attorney, Agent, or Firm* — Locke Lord LLP; Scott D. Wofsy; Christopher J. Capelli

(57) ABSTRACT

A computer-implemented method for supervising data stream storage including communicating with a probe that captures network data and outputs a plurality of data streams to a plurality of data repository units, receiving registration data associated with respective data streams that identifies the associated probes, selecting at least one of the data repository units to store the first data stream in real time based on a storage capacity of the data repository units to receive and store data, determining that storage capacity is not sufficient for the data stream in response to a change in the storage capacity of the data repository units to receive and store data, determining a corrective action in response to the determination that the storage capacity is not sufficient, and notifying the probe identified in association with the first data stream about the corrective action.

20 Claims, 8 Drawing Sheets

METHOD AND SYSTEM FOR DYNAMIC HANDLING IN REAL TIME OF DATA STREAMS WITH VARIABLE AND UNPREDICTABLE BEHAVIOR

FIELD OF THE INVENTION

Embodiments of the present invention relate to network storage, and particularly to informed dynamic handling in real time of data streams with variable and unpredictable behavior.

BACKGROUND OF THE INVENTION

Reliable and efficient storage of data and, in particular, data used by enterprises is becoming increasingly important. Various data duplication, backup and/or data mirroring techniques are used by enterprise data storage systems. Typically, the data is distributed over several data servers, so that a crash of one server or loss of the connection to that server does not affect the data integrity.

Various approaches exist that enable resources such as data centers and Internet-Protocol (IP)-based networks to scale as the needs of the various users and applications increase. In some cases, this requires the purchase of large, expensive hardware that typically provides more capacity than is immediately necessary. For a large number of resources to be used, this can provide a significant expenditure and overhead, which can be undesirable in many instances and likely requires manual calibration/tuning based on hardcoded Quality-of-Storage (QoSt) concepts.

It is desired to have the level or redundancy, the level of reliability and the level of data availability as a single service, so a user can have choices and can select certain guarantees of data availability and of quality of data storage.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with an aspect of the disclosure, a master controller for supervising data stream storage is provided. The master controller includes at least one processing device, wherein the processing device is configured to execute programmable software instructions to perform operations. The operations include communicating with at least one probe that captures network data and outputs the captured network data as a plurality of data streams of network data to a plurality of data repository units and receiving from the at least one probe registration data associated with respective data streams that are output by the at least one probe. The registration data includes identification of the associated probes that output the respective data streams. The operations further include selecting at least one data repository unit of the plurality of data repository units to store the first data stream in real time based on a capacity of the plurality of data repository units to receive and store data. The operations include determining that capacity is not sufficient for the data stream in response to a change in the capacity of the plurality of data repository units to receive and store data and determining a corrective action in response to the determination that the capacity is not sufficient. In addition, the operations include notifying the probe identified in association with the first data stream about the corrective action.

In another aspect, a computer-implemented method for supervising data stream storage is provided. The method includes communicating with at least one probe that captures network data and outputs the captured network data as a plurality of data streams of network data to a plurality of data repository units and receiving from the at least one probe registration data associated with respective data streams that are output by the at least one probe. The registration data includes identification of the associated probes that output the respective data streams. The method further includes selecting at least one data repository unit of the plurality of data repository units to store the first data stream in real time based on a storage capacity of the plurality of data repository units to receive and store data and determining that storage capacity is not sufficient for the data stream in response to a change in the storage capacity of the plurality of data repository units to receive and store data. In addition, the method includes determining a corrective action in response to the determination that the storage capacity is not sufficient and notifying the probe identified in association with the first data stream about the corrective action.

In another aspect, a method for supervising data stream storage is provided. The method includes capturing network data and outputting the network data captured as a plurality of data streams to a network storage system having a plurality of data repository units, wherein the output network data has associated registration data that identifies the respective data streams. The method further includes receiving in real time notification of a corrective action in response to a determination that storage capacity associated with a selected at least one data repository unit of the plurality of data repository units is no longer sufficient to store a first data stream of the plurality of data streams, wherein the determination is based on a change in real time storage capacity of the plurality of data repository units to receive and store data and the notification identifies the data stream affected by the corrective action.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
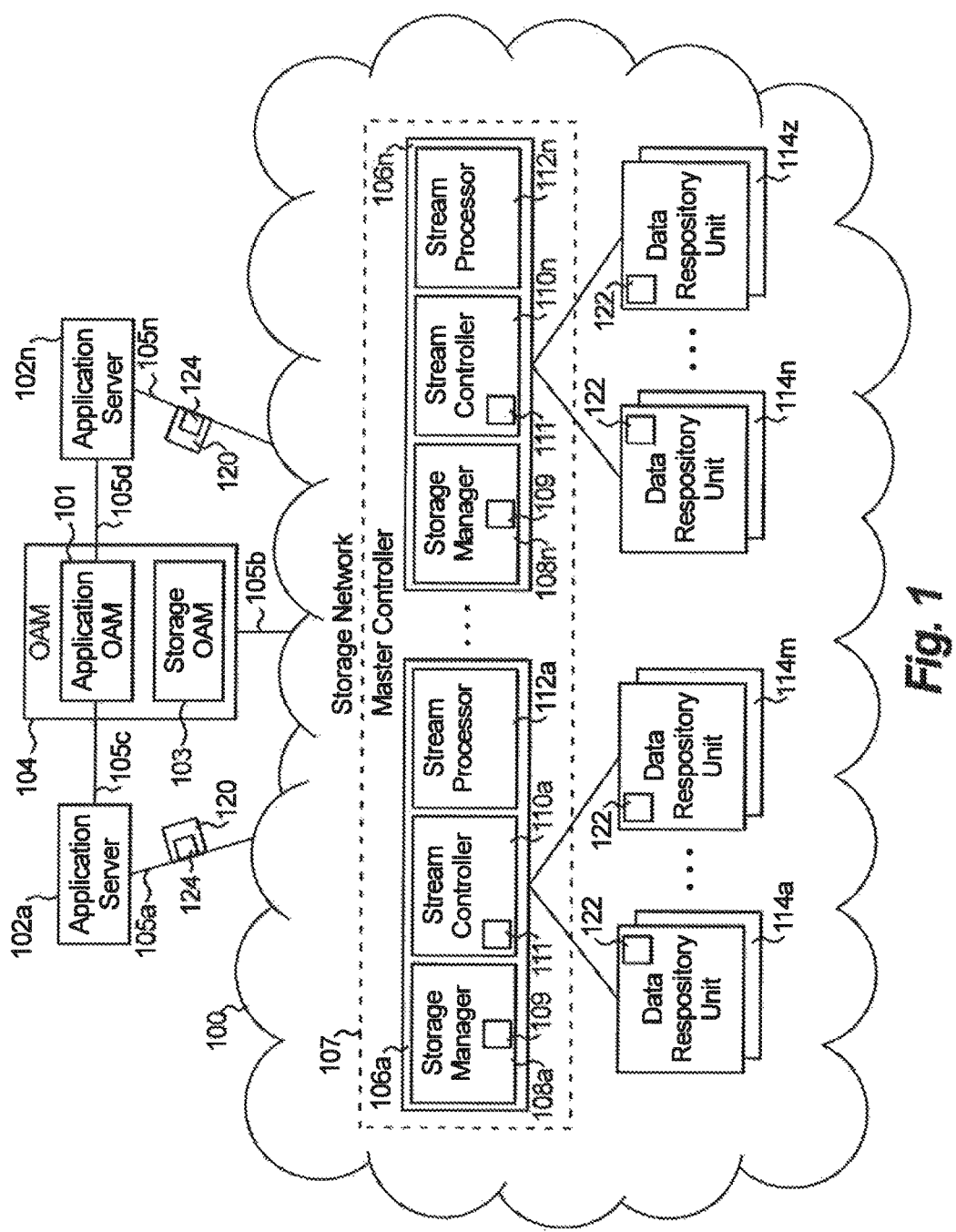
FIG. 1 is a block diagram illustrating a network computing environment in which aspects of the disclosure are implemented in accordance with certain illustrative embodiments.

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Described embodiments of the present disclosure concern a comprehensive distributed data management platform that includes a variety of mission critical applications, large number of application servers running different operating systems, processing nodes, storage units with differing capabilities, and many network elements that interconnect application servers with storage units. Transparently scalable storage management platform described herein deals with many storage aspects, such as, for example, but not limited to, storage network topology, performance, recoverability, capacity planning and security and handles transient as well as persistent aspects: e.g., processing real-time data access I/O requests (transient) and data (persistent) received from a variety of both data traffic-generating and data traffic-receiving distributed client applications. The described embodiments of the present disclosure allow the integration of business objectives, specifying resource usage, availability, recoverability priorities; system model, specifying what changes should be noticed and how; metrics, specifying what and how to measure in the storage network, and when to raise "alarms"; and service contract, specifying the monitorable interactions with other components (e.g. applications) of the described ultra-high throughput storage infrastructure.

Generally, there is a number of quality-related parameters p1, p2 . . . pn that can characterize the storage traffic. These parameters include, but not limited to, throughput, retention time, priority (i.e., relative importance), robustness (i.e., redundancy or replication requirements) and retrieval speed. It is noted that the ranges [pi Min, pi Max] of quality related parameters may vary rapidly and unpredictably over time and may be extremely large at least in some cases. For example, stream bandwidth can vary unpredictably from very low to very large. As another non-limiting example, the retention period for some stream items may vary from very short to very long. Thus, the overall set of parameter values that Quality-of-Storage (QoSt) system should support can be represented by a hypercube [p1 Min, p1 Max]*[p2 Min, p2 Max]* . . . *[pn Min, pn Max]. In order to fully support this set of parameter values the data management platform should include the entire hypercube. In other words, this type of infrastructure would require having enough hardware resources to ensure contemporaneously enormous capacity, enormous speed, multiple levels of replication, and the like. In most cases, the cost of such hardware infrastructure quickly becomes prohibitive by orders of magnitude.

Conventional storage techniques utilizing files and directories typically support general purpose workflows and provide some flexibility to client applications with respect to data organization. However, typically, such flexibility may have negative effect on storage system's performance. There is a growing demand for storage of multi-media data objects such as movies, music, games, books, texts, graphics, and interactive programming. Known devices for storing large multi-media data objects comprise disk drives designed to read and write at the same speed. Disk drives that read and write at the same speed were designed for computer applications, where it is important to both read and write quickly, and where each disk access operation has an equal probability of being a read operation or a write operation. Requirements for multi-media object storage and retrieval are different than requirements for storing computer applications. The advantages of object storage systems, which store data objects referenced by an object identifier versus file systems, which store files referenced by an inode, or block based systems which store data blocks referenced by a block address in terms of scalability and flexibility, are well known. Object storage systems decompose the data and distribute it across a large number of storage nodes, which typically include controllers and disks. Object storage systems in this way are able to surpass the maximum limits for storage capacity of file systems in a flexible way. This makes such object storage systems excellent candidates for large scale storage systems.

However, known large scale storage systems, including object storage systems, have several drawbacks: associating treatment of data to fixed hardware or software configuration, thus making it difficult to adapt to ever changing traffic patterns and lack of built-in policies and mechanisms to fully enable differentiated treatment of data. In some cases when an individual application makes valid storage decisions, its decision methods may become invalid over time when the traffic patterns change. In addition, conventional storage systems are typically too generic and require costly customized configuration to optimize performance with respect to client applications' data model. One additional factor that does need to be accounted for, however, is that I/O response times from different storage tiers can differ considerably, since tiers can have vastly different underlying performance capabilities. Overall, even though object storage systems are good candidates for large scale storage systems, scaling in such systems may cause significant negative impact on overall performance of client applications. Stream based storage systems disclosed herein offer significant performance improvements at a minimal cost, thus substantially outperforming other large scale storage solutions.

Embodiments of the present disclosure provides handling and storage of data streams having unpredictable throughput patterns with high flexibility and robustness. Advantageously, the stream based storage network supports an adaptive handling of data streams that can change data retention policies and provide notification regarding such changes.

Turning to FIG. 1, it is intended to provide a brief, general description of an illustrative and/or suitable exemplary network computing environment in which embodiments of the below described present disclosure may be implemented. A particular embodiment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As illustrated in FIG. 1, a plurality of application servers 102a-102n may transmit data to the storage network 100, which in turn distributes it over storage resources referred to herein as data repository units (DRUs) 114 (referred to herein individually as "data repository unit 114" and collectively as "data repository units 114a-114z" or as "data repository units 114"). The respective data repository units 114 include a DRU controller 122 that includes a processing device executing software instructions to perform the method of the disclosure as described. One or more probes 120 are coupled to respective pipes 105a-105n to monitor or capture network data flowing between the application servers 102a-102n and the storage network 100. Each probe includes a probe controller 124 that includes a processing device executing software instructions to perform the method of the disclosure as described.

A master controller 107 includes a plurality of storage nodes 106 (referred to herein individually as "storage node 106" and collectively as "storage nodes 106a-106n" or as "storage nodes 106"), DRU controller 122, and probe control units 124. The respective storage nodes 106 include various QoSt based storage management related modules (e.g., storage manager modules 108 (referred to herein individually as "storage manager 108" and collectively as "storage manager modules 108a-108n" or as "storage managers 108"), stream controller modules 110 (referred to herein individually as "stream controller 110" and collectively as "stream controller modules 110a-110n" or as "stream controllers 110") and stream processor modules 112 (referred to herein individually as "stream processor 112" and collectively as "stream processor modules 112a-112n" or as "stream processors 112") configured to route data, created by application server 102a-102n applications (such as database applications or any other data processing application known in the art) to data repository units 114 based on the QoSt characteristics of the received data items. The concerted efforts of the illustrated modules allow the storage network 100 to dynamically adapt to data item formats provided by the plurality of application servers 102a-102n rather than requiring extensive development, even for simple applications, of interfaces that present the incoming data items to the storage network 100 according to a pre-defined data model.

FIG. 1 shows that in one exemplary embodiment a first plurality of data repository units, such as 114a-114m, may be directly attached to one storage node 106a, while a second plurality of data repository units, such as 114n-114z, may be directly attached to another storage node 106n.

The application servers 102a-102n may comprise any computational device known in the art (e.g., a workstation, personal computer, mainframe, server, laptop, hand held computer, tablet, telephony device, network appliance, etc.). The probes 120 can be active or passive probes capable of monitoring or capturing data flowing through pipes 105. For example, passive probes can capture raw network packets and store the raw packets, and active probes can analyze contents of the raw packets and generate derived content such as call detail records, statistics, top called numbers, most active web pages, etc.

The data repository units 114 may comprise any storage device, storage system or storage subsystem known in the art that directly connects to the storage network 100 or is attached to one or more storage nodes, such as the data repository units 114a-114z directly attached to storage nodes 106a-106n. The data repository units 114 may comprise a Just a Bunch of Disks (JBOD), Redundant Array of Independent Disk (RAID), Network Attached Storage (NAS), a virtualization device, tape library, optical disk library, etc.

The storage network 100 may comprise any high-speed low-latency network system known in the art, such as a Local Area Network (LAN), Storage Area Network (SAN), Intranet, Wide Area Network (WAN), the Internet, etc. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 2:
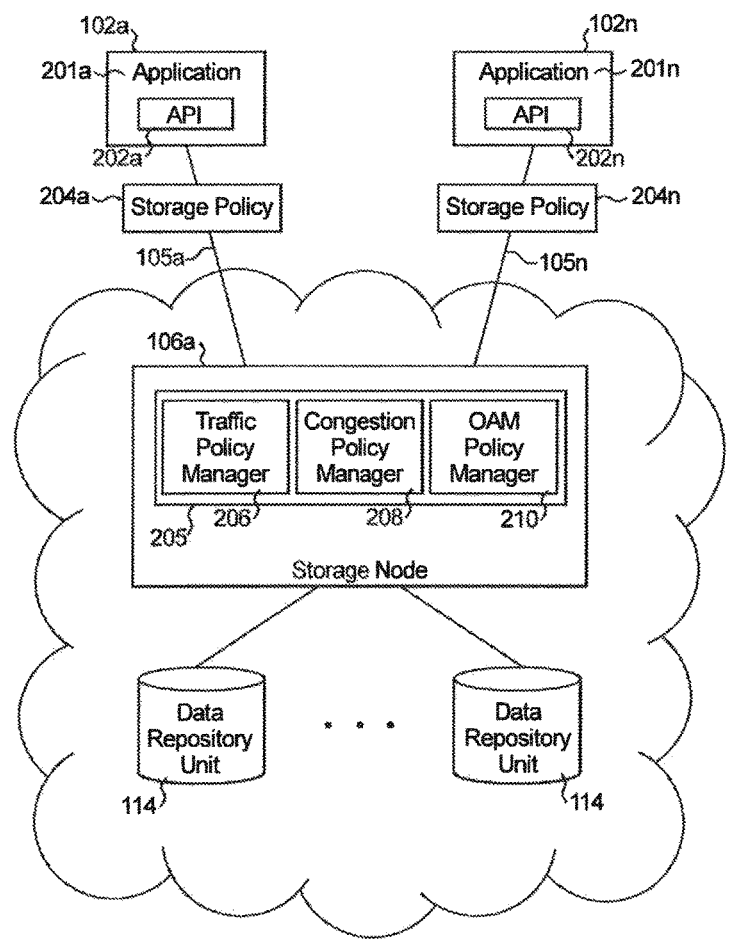
FIG. 2 is a block diagram illustrating a further view of the network computing environment of FIG. 1 with a Quality-of-Storage (QoSt) based storage management architecture, in accordance with an illustrative embodiment of the present disclosure.

The storage nodes 106a-106n may comprise any device capable of managing application access to a storage resource, such as any server class machine, a storage controller, enterprise server, and the like. It is noted that FIGS. 1 and 2 depict a simplified two-tiered model of the QoSt-based storage network 100. In various embodiments, the storage nodes 106 may comprise a hierarchy of sub-nodes. The various functions supported by these sub-nodes may be distributed among several storage nodes 106. Furthermore, at least some of the storage nodes 106 may not support all the functions. According to embodiments of the present disclosure, the data repository units 114 are viewed by the storage network 100 as the lowest-level entities in this hierarchy. One of the challenges by the QoSt based storage network's framework 100 is that data repository units 114 have highly uneven parameters (capacities, throughputs, etc.) that need to be managed.

The components of the master controller 107, including the storage nodes 106, the DRU controllers 122, and the probe controllers 124, while being physically distributed, interact and cooperate with one another to logically operate as one central master controller. In embodiments, the DRU controllers 122 and/or the probe controllers 124 are daemons of the master controller 107. Accordingly, the DRU controllers 122 and/or the probe controllers 124 can be installed by the master controller 107 (e.g., one of the storage nodes 106) to be executed by processing devices residing in the associated data repository unit 114 or probe 120. The components of the master controller 107 cooperate to make decisions regarding movement of data streams and modification of retention policies associated with the data streams and implementation of such decisions. The plurality of storage nodes 106 can be physically distributed yet logically centralized to cooperate in making these decisions.

As shown in FIG. 1, in one embodiment, application instances may be distributed across a number of network nodes (application servers 102a-102n), each instance capable of connecting to any available storage node 106a-106n with no substantial limitations regarding the amount or type of data it may send (except where physical boundary, policy or limitations of bandwidth may apply). In various embodiments, the application instances running on the application servers 102a-102n are not tasked with allocating storage resources (e.g., I/O bandwidth, load balancing, etc.), configuring (e.g., assigning IP addresses, VLANs, etc.) or monitoring bandwidth of each data repository units 114, maintaining separate file systems, and the like. It should be apparent that all of these are managed internally by the storage nodes 106a-106n transparently to the application instances.

According to one embodiment of the present disclosure, connectivity to the storage network 100 may be defined in terms of generic pipes 105a-105n of raw data. Data piping between distributed applications and storage network 100 (e.g., a writer application on the application server 102 and a storage management application, i.e. storage manager 108a on the storage node 106a) includes the writer application writing data to a pipe, i.e. pipe 105a, and the storage management application reading data from the pipe 105a. The pipe is a conduit of one or more streams of data. It is noted that each pipe 105a-105n can carry data items from any number of streams and from any number of initiators (i.e., applications). For example, any application running on the application server 102a can connect to the storage network 100 through pipe 105a at any point, without requiring any configuration. In other words, an application does not need to know which pipe 105a-105n is connected to which of the plurality of storage nodes 106a-106n, etc.

Furthermore, for any stream sent by an application over one or more of said pipes 105a-105n, each data item preferably belongs to one of a plurality of supported item types. As a non-limiting example, if the data items are documents, then the corresponding item type could be PDF, Word, Excel, and the like. As another non-limiting example, if the data items are network packets, the corresponding item type can be the network protocol to which the packet belongs. It is to be understood that the set of item types can be any combination of the above and of other similar categories of interest. In one embodiment of the present disclosure, a data item may be encapsulated in metadata (for example, a header plus attributes) where the corresponding item type is a metadata tag attached to the data item. The application may choose to tag each data item itself, or it may let the tagging to be done by the storage network 100. In various embodiments, a large number of supported (i.e. of interest) data item types may be configurable at the storage network level. Untagged data items or data items that do not match any type of interest may be tagged with the type "unknown", for which there is customizable behavior just as there is for the other item types.

In addition to the item type, other secondary metadata tags can be associated with the data items, in order to refine their classification. As a non-limiting example, if the item type is "audio", additional metadata tags can specify encoding, duration or a multitude of other attributes. These values can be used by the storage network 100 to optimize the retrieval of data items (for example by indexing them) as well as to satisfy the applicable QoSt requirements.

According to an embodiment of the present disclosure, the storage network 100 considers and evaluates all data as global. In other words any data from any pipe 105a-105n may be available for any application running on any application server 102a-102n under any filtering/aggregation conditions. It should be apparent to one of ordinary skill in the art that one of the advantages of using stream-based storage is that the software applications do not need to know the specific location of the memory for saving and retrieving data. The applications are not required to send items of the same type over the same pipe 105a-105n. Furthermore, there is no need for applications to organize data items into various structures like tables and/or databases; there is no requirement to select a server that understands the corresponding data item types. In the stream-based storage system, applications are no longer required to balance network traffic (throughput) and/or manage capacity between several network nodes. This mode of interfacing the storage network 100 could be generally defined as "plug-and-stream" mode.

As described below, the storage network 100 has built-in capabilities to segment the received data and to distribute it to various storage resources (i.e. data repository units 114) according to various factors, such as, but not limited to, the storage network topology, current or predicted capacity to receive and store data by data repository units 114, and the like. Advantageously, the storage network 100 is enabled to adapt dynamically to the current data traffic conditions thus substantially preventing applications from observing any data storage restrictions. In addition, the stream based object storage network 100 utilizes the predetermined relationships between items (objects) in the same stream to optimize the management of items and to provide efficient allocation of storage resources to a variety of client applications.

In order to provide the above described capabilities of the QoSt-based storage network 100, each storage node 106, within the storage network 100 may utilize a number of software components (modules). In one embodiment of the present disclosure, each storage node 106 may include a storage manager 108, a stream processor 112 and a stream controller 110. The storage manager 108 may generally be a software module or application that coordinates and controls storage operations performed by the storage node 106. The storage manager 108 may communicate with all elements of the storage node 106 regarding storage operations. The storage manager 108 receives data via one or more data pipes 105a-105n and sends it to a corresponding stream processor 112. The stream processor 112 may generally be a software module or application that monitors streams usage in real time and performs a plurality of data management operations using a differentiated treatment of received data based on a plurality of QoSt attributes. The stream controller 110 may generally be a software module or application that monitors and predicts resource utilization. In addition, the stream controller 110 may be configured to perform corrective actions in response to predicting and/or detecting any degradation of service.

The storage managers 108 of the respective storage nodes 106 can include a DRU manager 109, and the stream controllers 110 of the respective storage nodes 106 can include a probe manager 111. The DRU manager 109 communicates with one or more DRU controllers 122, such as to send control messages or to receive information about a DRU's current or predicted capacity to receive and store data or alerts. The capacity to receive and store data includes bandwidth capacity and storage depth capacity information.

The bandwidth capacity information refers to the associated DRU's 114 ability to write data to a buffer for short term storage until the data can be written to disk. Each raided disk array included in a DRU 114 has a limited write bandwidth that it can sustain, which can be expressed, for example, as megabytes per second. When additional raided disk arrays are added to a single DRU 114, the sustainable write bandwidth of the DRU 114 is increased, for example to a range of gigabytes per second.

The storage depth capacity refers to the total disk space available. Each storage unit has a fixed number of raided hard drives in a disk array and therefore has a limited total disk space, usually in the order of terabytes or petabytes. When DRUs 114 are added, or raided hard drives are added to a DRU 114 the effective storage disk space is increased. As data streams are removed from storage by a DRU 114 the effective storage space increases. The storage depth capacity can be predicted based on retention periods associated with stored data streams.

The probe manager 111 communicates with the probe controller 124, such as to send control messages or to receive information about the network data or the probe.

As shown in FIG. 1, at least in some embodiments, one or more OAM modules 104 may be connected to the storage network 100, for example, via a dedicated pipe 105b. OAM module 104 may include a user interface and may be used to configure and/or control the above-described components of storage nodes 106a-106n, distribute software or firmware upgrades, etc. User interface (not shown in FIG. 1) of the OAM module 104 may be configured to present current state of QoSt network and to provide degradation of service notifications and other relevant information to the end-users. In one embodiment, the OAM module 104 may include two different components—storage OAM component 103 which interfaces directly with the storage network 100 via pipe 105b and application OAM component 101 which interfaces directly with application servers 102a-102n via pipes 105c and 105d. It should be noted that the application OAM component 101 need not be aware of storage network's 100 configuration in order to make use of QoSt capabilities.

According to an embodiment of the present disclosure, storage nodes 106a-106n illustrated in FIG. 1 can be flexibly distributed on various hardware platforms and then directly interconnected as needed. Storage nodes 106 can also be grouped into "node groups" which are collocated depending on the total capacity/performance requirements requested by various applications. Furthermore, all software components 108-112 may be entirely implemented on each storage node 106a-106n, or the software components 108-112 may be implemented in a distributed computing environment on multiple types of storage nodes running the same or different operating systems and that communicate and interact with each other over the storage network 100. If a function provided by a specific software module is not available on a given storage node 106, then data traffic can be transparently re-routed to storage nodes 106 having that capability.

Resources of storage network 100 may generally be susceptible to being adapted to serve a given demand or need, for example by providing additional processing or storage resources. However, because the demand placed on the storage network 100 can vary with time, it is necessary to manage the resources that are available. If the available resources are insufficient for a given demand, performance of the storage network 100 may be compromised. Conversely, if the available storage network 100 resources greatly exceed the demand, the resources may be wasted, resulting in unnecessary costs or lost opportunity in which the resources could have been applied to other needs. Burst activity, in which the demand placed on resources, may increase very rapidly, for example, increasing many multiples or orders of magnitude over the course of minutes or a few hours, can create many challenges to storage network 100 management. In order to meet the changing needs in the storage network illustrated in FIG. 1 various scaling strategies may be implemented. The scaling strategy may include vertical scaling and horizontal scaling. Advantageously, by allowing storage nodes 106a-106n with the same logical function/level in the hierarchy to collaborate in order to perform a global, distributed service, the horizontal scaling can be achieved fairly easily.

FIG. 2 is a block diagram illustrating a further view of QoSt based storage management architecture, in accordance with an illustrative embodiment of the present disclosure. According to an embodiment of the present disclosure, QoSt based storage management framework can be implemented as a policy based storage management framework. One or more policies associated with one or more applications can specify how data having certain characteristics will be managed throughout its lifecycle. Generally, a policy is a "condition-action" tuple. The condition part specifies an event or state that acts as trigger(s) for the action part to be executed. The condition can reflect an attribute value, which may include, but are not limited to, data repository units' 114 capacity changes, short lived traffic bursts, network topology changes, and the like. The action(s) associated with the occurrence of one or more conditions may involve the execution of specific procedures or functions, the raising of other conditions, and/or the setting of other attributes to particular values. In this last case, an action may thus establish triggers for other actions.

FIG. 2 illustrates a conceptual view of how policy based management can be applied to the QoSt based network 100. The storage network 100 includes numerous storage nodes 106 linking the customer applications 201a-201n to one or more data repository units 114, such as one or more interconnected disk drives configured as a Redundant Array of Independent Disks (RAID), Just a Bunch of Disks (JBOD), Direct Access Storage Device (DASD), etc. Typically, a customer will pursue a service level agreement (SLA) with the storage service provider concerning the criteria under which network storage resources are provided, such as the storage capacity, network throughput, I/O response time, I/O operations per second, and other performance criteria under which the storage resources will be provided. In certain situations, multiple customers with different levels of requirements specified in their service level agreements will share the same storage resources. This requires that the storage service provider monitor and manage the storage resources to ensure that the different customer requirements specified in the different service level agreements are satisfied. For the purpose of simplicity of illustration only one storage node 106a is shown within the storage network 100, it being understood that the storage network 100 may include a plurality of the same or different types of storage nodes 106.

As shown in FIG. 2, the storage node 106 may be configured to provide data storage and retrieval service to one or more applications 201a-201n configured for execution on one or more application servers 102a-102n. Each application 201a-201n may include an API (Application Programming Interface) 202a-202n which may support communication between applications 201a-201n and storage nodes, such as storage node 106. API 202 may support data stream related requests, typically data storage and retrieval requests, from applications 201 running on the application servers 102a-102n. From an application point of view, storing or retrieving information from/to the storage network 100 may be transparent. For example, since, according to various embodiments of the present disclosure, applications 201a-201n read or write information from/to data pipes 105a-105n, preferably, these applications 201a-201n are not particularly concerned with a type of storage system connected to the other end of the pipe. In fact, from their point of view the storage system does not necessarily comprise a distributed data storage network but may include any other type of storage solution, for instance a file server or a hard drive. One main difference between a conventional object storage system and a stream based storage system disclosed herein is that data is stored as the group of related items (stream), rather than the basic object, based on bandwidth capacity and duration. The term "data stream", as used herein refers to a sequence of time-ordered items.

In another aspect, the disclosed "plug-and-stream" concept relates generally to substantially minimized requirements for the applications to support specific storage APIs 202. In some embodiments, no such APIs 202 are required and the application does not need to be modified at all. For instance, in the case where network interface/device "taps" are employed by the storage network 100 as probes 120 in order to snoop the relevant traffic, the data items comprise the network packets that are visible on the tapped interfaces/ devices. In these embodiments, there may be either minimal or no requirements for the subject APIs 202 for retrieval purposes. In other words, the storage network 100 may be configured to provide back data-feeds of processed information and essentially to "stream out" data to the one or more applications 201a-201n in the same way that it takes the data in.

If desired, the stream processor 112 may augment conventional data management operations with additional data structures. For example, the one or more applications 201a-201n issuing a data storage request may assign keys in order to locate information more efficiently within the stored plurality of data streams. In one embodiment, a key may be created for each data item contained in each data stream. Stated otherwise, each key corresponds to an item in the data stream and acts as an index to the plurality of data streams. The collection of keys forms an index vector, which, in one exemplary embodiment, may be maintained by the stream processor 112.

In order to achieve the above-mentioned objectives, such as satisfying performance requirements, achieving transparency and dynamic adaptation of changing demand of storage resources, according to an embodiment of the present disclosure, the QoSt based storage network 100 may utilize a storage policy concept, which enables remodeling of the incoming application data with respect to groups of various data streams for a number of different data types. Storage policies 204a-204n may be used to control the manner in which a particular task/application 201 accesses or consumes storage resources as data repository units 114, or to prioritize that task/application relative to others. In one embodiment, storage policies 204a-204n may be used to define various item types and may be used to define user configurable rules for filtering and classification of data. As used herein, storage policies 204a-204n concern an application's requirements on the data that it generates or uses— and, based at least on such policies, various software components of storage nodes 106 make a decision related to a choice of data repository units 114 on which the application provided data should reside. For instance, an application 201a may have specific requirements for the speed and format of data access, or for recoverability of the data in the event of an outage. The speed of access may be a consequence of needing to achieve a certain transaction rate, and may potentially vary during application execution. Hence, different applications 201a-201n may require different access rates when accessing the same data, or may require different types of I/O (e.g. read vs. write, sequential vs. random). Thus, one of the objectives of the QoSt based storage network 100 is to achieve differentiated treatment of data.

To implement the differentiated treatment of data each of the storage policies 204a-204n may comprise a plurality of orthogonal QoSt attributes. According to an embodiment of the present disclosure, the QoSt attributes may include, but not limited to, data priority value, data retention time value, data robustness value, I/O performance requirement values, client priority value, storage category value, data security class, and the like. However, more generally, QoSt attributes could be a defined set of attributes that consider other properties of various data contents types and/or other properties that may be relevant to various applications 102a-102n. According to an embodiment of the present disclosure, this set of QoSt attributes may be dynamically configurable by an end user, for example via the OAM node 104, and having substantially immediate effect on the storage network 100 and storage policies 204a-204n.

The client priority represents a relative importance of the client application 201 that issues a data storage/retrieval request to the QoSt based storage network 100 with respect to a set of all applications 201a-201n that are currently communicating with the QoSt-based storage network 100. Additionally, the different types of data may be prioritized. For example, a data priority value may be assigned for each type of data indicative of the priority for that type of data. The priorities may be predetermined. Those skilled in the art will understand that any range of priority values may be used in accordance with embodiments of the present disclosure, but for illustrative purposes as used herein, priorities range from 7 (lowest) to 0 (highest).

According to an embodiment of the present disclosure, retention management capabilities may be controlled within the disclosed storage network 100, wherein applications 201a-201n have the ability to set a given dataset (e.g., a data stream) for retention for a particular retention period by assigning corresponding retention date(s) in a data retention time attribute of the given data stream. In one embodiment, the data retention time value may represent the minimum and maximum amount of time that the user requires the particular data stream to be retained in storage. As used herein, the data robustness value indicates the amount of redundancy/robustness required for a particular data stream, such as, but not limited to, storing data in volumes of different RAID types, a number of replications required, geographic redundancy, etc. The I/O performance requirement values associated with a particular data stream represent the relative speed at which this particular data stream needs to be accessible to the requesting application. Accordingly, storage manager component 108 (shown in FIG. 1) may assign I/O performance sensitive data types to higher bandwidth and lower latency paths within the storage network 100 such that the I/O performance related QoSt requirements for the data type are satisfied.

According to an embodiment of the present disclosure, the storage category value represents the type of physical storage requested for the data. This attribute controls which data repository unit 114 will be selected from a heterogeneous pool of physical storage devices 114a-114z. As discussed above, different types of physical storage devices may include, but are not limited to flash memory, solid-state drives (SSDs), hard disk drives (HDDs), etc. In addition, this attribute may indicate whether the data stream should be stored in directly attached or remotely located storage devices. According to an embodiment of the present disclosure, the data security class attribute may be used to control security mechanism within the QoSt storage network 100. The data security class indicates the required security level for a given data stream. This attribute may affect, for example, the level of provided data encryption and/or the selected type/location of the physical storage for the given data stream.

Referring back to FIG. 2, it should be understood that many applications 201a-201n may be able to define how critical each data type is for them, thus making the conventional storage contract more flexible on a case-by-case basis. In other words, the QoSt attributes described above represent a novel refinement of the conventional fixed SLA. A particular set of values (assignments) for the totality of supported QoSt attributes constitutes a storage policy that is applicable to a certain portion of the incoming application data. Correspondingly, the storage network OAM module 104 may include a pre-defined set of general-purpose storage policies, which may correspond to a best-effort attempt to optimize the processing and storage of the received data. However, at the same time, the storage network OAM module 104 may also enable the user to "refine" the storage network behavior by flexibly configuring what the relevant "portions" of traffic are and their associate QoSt attributes. As a non-limiting example, the following suitable attributes can be used, either individually or in combination, to define different portions of data traffic and assign them to different storage policies: data source domains, data source links, network addresses (source and destination) for data traffic, network protocols utilized by the data traffic, data transport layer parameters for the link over which the plurality items is streamed, item types and other item metadata values (tags) described above.

As previously indicated, one or more relevant QoSt attribute values may be contained within the storage policies 204a-204n that may be provided to storage interface 205 of storage nodes 106 by each application 201a-201n being served by the storage network 100. According to an embodiment of the present disclosure, in addition to storage policies 204a-204n, the disclosed storage interface 205 may employ a variety of internal policies including, but not limited to, traffic management policy, congestion control policy, OAM policy, and the like. These policies may be controlled by various storage interface components, such as, traffic policy manager 206, congestion policy manger 208, OAM policy manager 210, and the like. It is noted that the storage interface 205 may be configured to dynamically create/modify the aforementioned policies based, at least in part, on the aggregated information provided by the plurality of received storage policies 204a-204n and based on the dynamically observed traffic/storage conditions within the QoSt storage network 100. According to various embodiments of the present disclosure, a traffic management policy may be directed to, for example, dynamic splitting, re-routing and/or aggregation of traffic according to the time-dependent observed traffic patterns. A congestion control policy may be directed to, for example, priority-based handling of traffic during periods of resource shortages, such as storage capacity exhaustion, processing power exhaustion, link bandwidth overflow, and the like. An OAM policy may be related to QoSt-specific OAM functionality, for example, such as specific configuration, maintenance, alarming, statistical reporting and other functionality enabling differentiated handling of storage data. It should be noted that stream based storage management framework disclosed herein is substantially different from conventional object based storage system because instead of managing the size and count of the objects, the quantum of storage (stream) is managed by one or more QoSt attributes such as data access rates and data retention time.

FIGS. 3, 4, 5 and 7 are flowcharts of operational steps of the storage manager module 108, stream processor module 112 and stream controller module 110 of FIG. 1, in accordance with exemplary embodiments of the present disclosure. Before turning to descriptions of FIGS. 3, 4, 5 and 7, it is noted that the flow diagrams shown therein are described, by way of example, with reference to components shown in FIGS. 1-2, although these operational steps may be carried out in any system and are not limited to the scenario shown in the aforementioned figures. Additionally, the flow diagrams in FIGS. 3, 4, 5 and 7 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Figure 3:
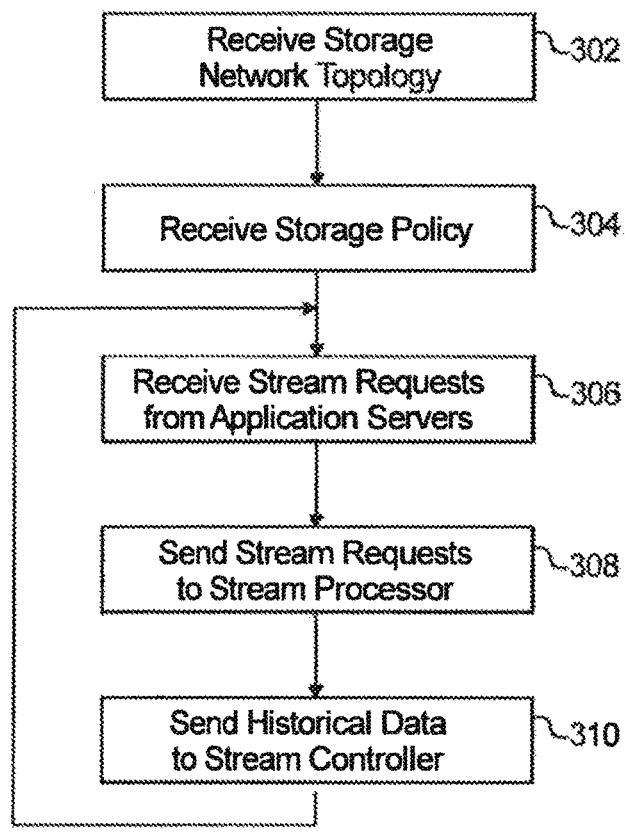
FIG. 3 is a flowchart of operational steps of the storage manager module of FIG. 1, in accordance with an illustrative embodiment of the present disclosure.

Starting with FIG. 3, FIG. 3 is a flowchart of operational steps of the storage manager module of FIG. 1. The storage manager 108 may generally be a software module or application that coordinates and controls storage operations performed by one or more storage nodes 106. At 302, the storage manager 108 preferably receives current storage network topology information. Obtaining current network topology from any node within the storage network 100 can be achieved in a number of ways. For example, the storage network 100 can be configured such that every storage node 106a-106n within the network has information about the current network topology. Alternatively, in another example, only a select number of storage nodes (e.g., first storage node 106a) within the storage network 100 may have information about the current storage network topology, where such storage nodes can share this information with other storage nodes such that every storage node 106a-106n within the storage network 100 is capable of providing current storage network topology information based upon a need/request for such information. A domain on the network topology can also be set, e.g., to limit the information obtained from the query to a specified number of data repository units 114 or a limited range (e.g., a limited number of hops) in relation to the requesting storage node 106a. Current topology information can be provided based upon constraints or limits established by the requesting storage node 106. For example, the storage manager 108 running on the requesting storage node 106 may be interested in a particular data repository unit 114 or set of repository units (e.g., repository units 114n-114z) within the storage network 100 instead of an entire storage network 100 domain.

At 304, the storage manager 108 preferably receives one or more storage policies 204a-204n from one or more applications 201a-201n. As previously indicated, each storage policy 204a-204n may comprise a plurality of orthogonal QoSt attributes. As used herein, storage policies 204a-204n concern an application's per stream requirements on the data that it generates or uses. These QoSt attributes facilitate the differentiated treatment of data streams contingent upon at least different types of data. Thus, storage policies 204a-204n may be used by the storage manager 108 to control the manner in which a particular application accesses or consumes storage resources at data repository units 114, or to prioritize that data stream relative to others.

Once the storage manager 108 processes and aggregates information related to storage network topology, at 306, the storage manager 108 may start receiving a plurality of data stream requests from one or more applications 201a-201n running on one or more application servers 102a-102n. According to an embodiment of the present disclosure each stream request may comprise one or more streams of raw data. In addition, the storage manager 108 may be configured to examine, classify and filter the received data at step 306. The storage manager 108 may classify the data streams based on, for example, data types detected within the received streams of data. In one embodiment, exemplary classifications may be somewhat broad, such as, but not limited to, a stream of user plane data and a stream of control plane data. In another embodiment, data may be classified using more specific categories, such as, but not limited to, streams of video data, audio data, and plain text data, etc. Generally, classification of data streams depends on types of applications being serviced by the QoSt based storage network 100. It should be appreciated that the storage manager 108 can detect the categories of traffic based on a very large number of classification criteria. The storage manager 108 may create a data structure for each classification. This step may further involve identifying a storage policy associated with each data stream from which the received data is collected. At 308, upon classifying data stream requests, the storage manager 308 may send stream requests to stream processor 112 for further processing. According to an embodiment of the present disclosure, at 310, the storage manager 108 may send information related to received data streams to the stream controller 110, which may be configured to monitor storage network status and to detect trends related to the received data or data types. Upon transmitting relevant data, the storage manager 308 preferably continues to perform steps 306-310 in an iterative manner.

Figure 4:
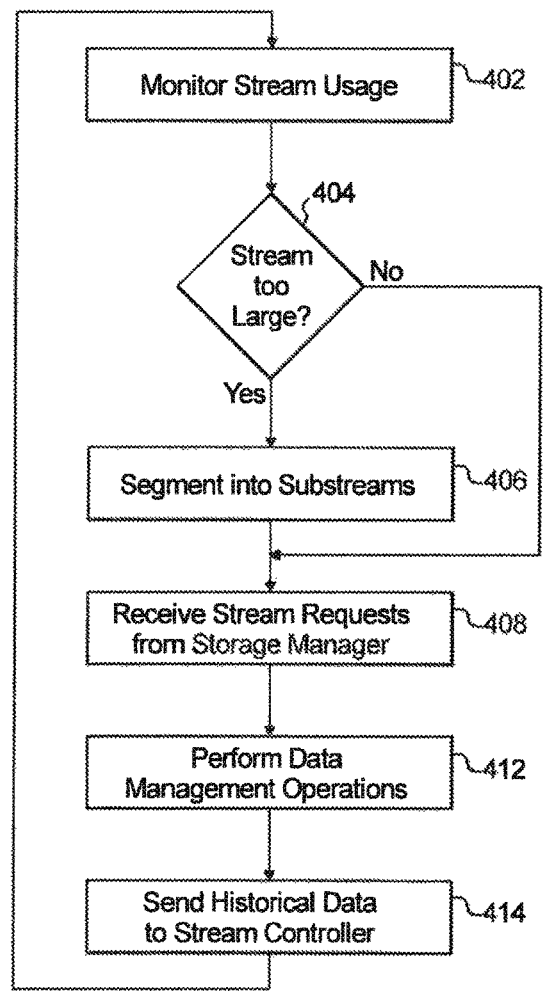
FIG. 4 is a flowchart of operational steps of the stream processor module of FIG. 1, in accordance with an illustrative embodiment of the present disclosure.

FIG. 4 is a flowchart of operational steps of the stream processor module of FIG. 1, in accordance with an illustrative embodiment of the present disclosure. The stream processor 112 may generally be a software module or application that performs a plurality of data management operations using a differentiated treatment of received data based on a plurality of QoSt attributes. At 402, the stream processor 112 preferably monitors stream usage in real time. In one embodiment this step may involve evaluation of all received data streams in order to measure data input and dynamically adapt to the incoming traffic. The stream processor 112 may further evaluate the stream usage in view of restrictions and requirements included in various storage policies. In other words, the stream processor 112 may be configured to adapt to the client applications' demands and to optimize its storage/retrieval functionality and resources accordingly.

It is noted that data repository units 114a-114z shown in FIGS. 1 and 2 may comprise any number of different forms of storage. Still further, each of the data repository units 114a-114z need not be limited to a single memory structure. Rather, the data repository unit 114 may include a number of separate storage devices of the same type (e.g., all flash memory) and/or separate storage devices of different types (e.g., one or more flash memory units and one or more hard disk drives). In an embodiment of the present disclosure, one or more data repository units 114 may have variable logical storage block sizes. Variable logical storage block sizes allow optimization of each data repository unit 114 for reading and writing different types of data items since applications tend to access different data types in different manners. For example, data associated with a video stream may be accessed in large sections at a time. As such, it may be more efficient for the stream processor 112 to use a large logical storage block size to organize such video media data for subsequent access by, for example, a video player application. Likewise, data associated with an audio stream may be accessed in large sections at a time, although such audio media sections may be smaller than the corresponding video media data sections. Accordingly, it may be efficient for the stream processor 112 to use a medium-sized logical storage block structure to organize audio data. Data associated with other data types may be efficiently handled by the stream processor 112 using cluster-sized logical storage blocks. Accordingly, the stream processor 112 may substantially constantly keep track of free storage available in the storage network 100.

Referring back to FIG. 4, at 404, the stream processor 112 may determine if any of the incoming streams are too large to fit in one of the available data repository units 114. If so (step 404, yes branch), at 406, the stream processor 112 may segment such incoming stream into two or more sub-streams. It is noted that these two or more sub-streams could be distributed among multiple data repository units 114 such as to fit within the throughput and storage capacity limitations of the available data repository units 114. Otherwise (step 404, no branch), at 408, the stream processor 112 may start receiving stream requests pre-processed by the storage manager 108, as described above.

At 412, the stream processor 112 may perform various data management operations to satisfy received stream requests. These data management operations may include, but not limited to, data traffic monitoring, data traffic management and data traffic congestion control. The stream processor 112 preferably performs data management operations contingent on a plurality of QoSt attributes. Thus, advantageously, the stream processor 112 facilitates different treatment for different types of data stream in accordance with the user-specified criteria (QoSt attributes). At 414, the stream processor 112 may send various historical data related at least to data management operations to the stream controller 110. Such information preferably indicates the quantity of free space remaining in the storage network 100. Upon transmitting historical data, the stream processor preferably continues to perform steps 402-414 in an iterative manner.

Figure 5:
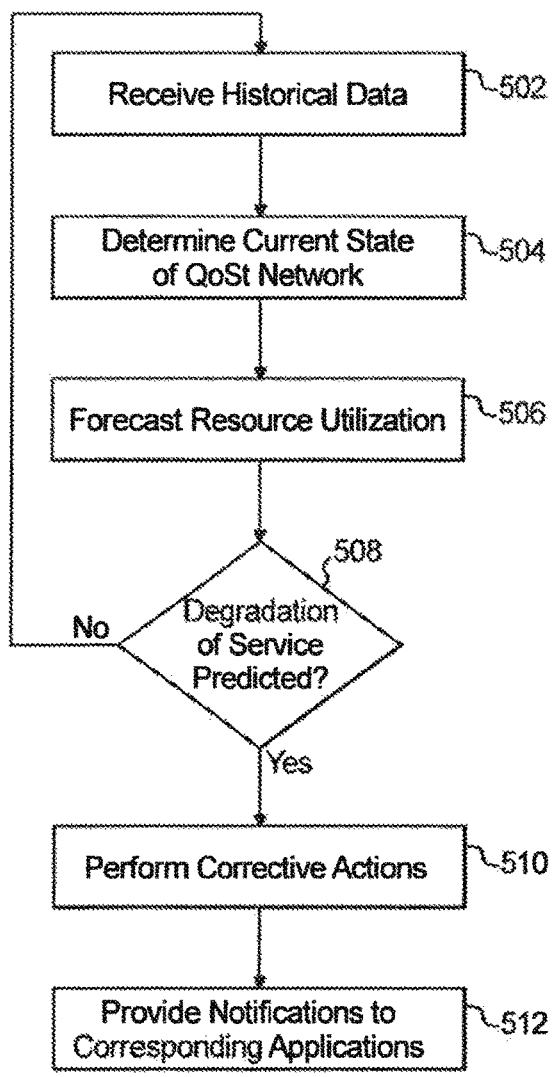
FIG. 5 is a flowchart of operational steps of the stream controller module of FIG. 1, in accordance with an illustrative embodiment of the present disclosure.

FIG. 5 is a flowchart of operational steps of the stream controller module of FIG. 1, in accordance with an illustrative embodiment of the present disclosure. The stream controller 110 may generally be a software module or application that monitors and predicts resource utilization. In addition, the stream controller 110 may be configured to perform corrective actions in response to predicting and/or detecting any degradation of service.

At 502, the stream controller 110 may aggregate data received from other software components, such as, but not limited to, the storage manager 108 and the stream processor 112. By aggregating information about various storage related operations, the stream controller 110 may perform real time analysis of incoming data traffic. Accordingly, at 504, the stream controller 110 determines a current or predicted state of the storage network 100 based on said real time analysis. Current state of the storage network 100 includes at least information related to current states of individual data repository units 114a-z. Next, at 506, the stream controller 110 may forecast resource utilization over a predetermined forecast period. For example, the stream controller 110 may forecast resource utilization based at least in part on associated historical storage, data retention periods associated with stored data streams, and computing resource load patterns. The historical resource load patterns may be with respect to the distributed storage service as a whole, particular data repository units 114a-z, particular data streams and/or a particular user of the data storage service (i.e., particular application 201). The stream controller 110 may further take into account the incoming data traffic as analyzed by the storage manager 108.

At 508, the stream controller 110 may determine whether a degradation of service is predicted. Degradation of service may include an indication of one or more degraded service level parameters, such as, but not limited to, increasing storage network congestion, exhaustion of available storage capacity, among many others. In response to detecting no degradation of service (step 508, no branch), the stream controller 110 may return back to step 502 to continue periodically collecting latest storage related information and monitoring current state of the storage network 100.

According to an embodiment of the present disclosure, at 510, in response to detecting or predicting any degradation of service (step 508, yes branch), the stream controller 110 may cooperate with other software components, such as storage manager 108 and stream processor 112 to perform one or more corrective actions. For example, in response to detecting increasing storage network congestion, the stream controller 110 may re-allocate the incoming data streams between processing storage nodes 106a-106n and/or may re-allocate the incoming data streams between physical data repository units 114a-z. According to an embodiment of the present disclosure, a plurality of stream controllers 110 running on one or more storage nodes 106a-106n may be configured to perform a distributed decision making procedure related to reassignment of incoming data streams. It is noted that if the stream controller 110 determines that considering the current or predicted state of the storage network 100 it is not physically possible to resolve the congestion by re-allocating data streams such that all storage parameters specified by QoSt attributes are satisfied, the stream controller 110 may decide to store information contained in the incoming data streams in order of precedence indicated by the QoSt data priority value described above. In other words, the stream controller 110 is configured to dynamically adapt to the current or predicted storage network 100 conditions and to make intelligent decision to save the most important data first and possibly discard the least important data. As another non-limiting example, in the situation where the stream controller 110 decides that it is not possible to resolve the storage capacity exhaustion problem by reallocating data streams between the available data repository units 114 and satisfying all storage parameters, the stream controller 110 may make a decision to reduce the retention time for the received and/or already stored data in accordance with the precedence indicated by the QoSt data priority value associated with each data stream. As yet another example, the stream controller 110 may discard or re-locate data having lower priority from a particular data repository unit 114 in order to accommodate incoming data from data streams having higher priority.

According to an embodiment of the present disclosure, at 512, the stream controller 110 may provide notifications to various applications 201a-201n being served by the storage network 100, wherein each notification may provide information related to a current or predicted state of the storage network 100 and/or information indicative of taken corrective action. In one embodiment, the stream controller 110 may communicate directly with the applications 201a-201n via the pre-configured API 202a-202n. In other embodiments, the stream controller 110 may employ alarm events, interrupts and other mechanisms well known in the art to communicate relevant information to a plurality of applications 201. In response, rather than adjusting their performance, the plurality of applications 201 may present information related to system capacity/performance (i.e., alarms and statistics) to end users, such as system administrators, network technicians, and the like, who may take one or more corrective actions, if necessary, as described below. In yet another embodiment, the stream controller 110 may provide various storage service related notifications to the OAM node 104. It should be noted that values of the various QoSt attributes are not necessarily fixed in time. Their values can be modified after deployment, because the storage network 100 is capable of adapting to them in a dynamic manner. By providing early warnings (via the disclosed notification techniques) based on user-defined criteria, the stream controller 110 allows system administrators and/or technicians supporting the storage network 100 take effective measures before service degradation occurs. Such measures may include, but are not limited to, fine-tuning individual applications 201, reconfiguration of individual storage policies 204a-204n and/or internal policies, such as traffic management policy, congestion control policy, OAM policy, performing storage scaling (either horizontal or vertical), among other measures.

Figure 6:
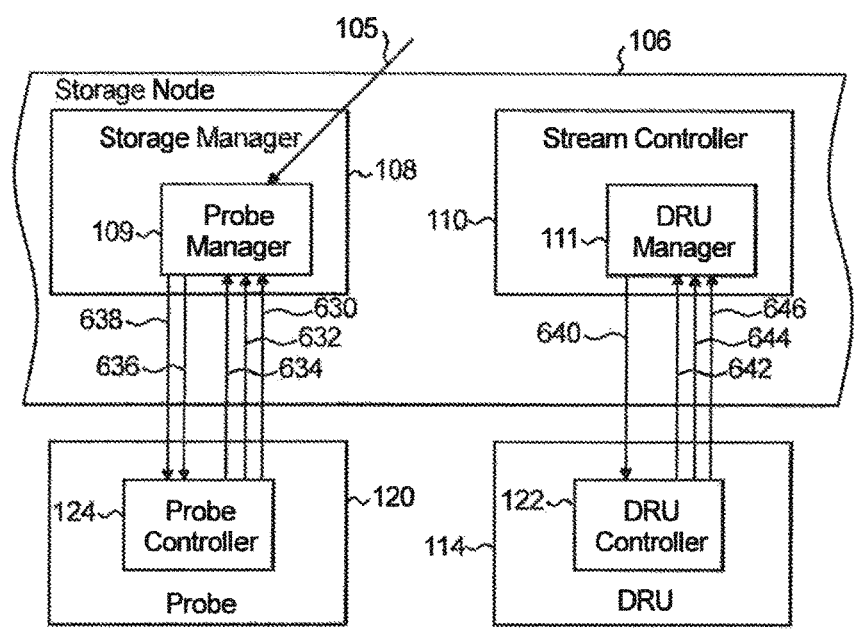
FIG. 6 is a flow diagram showing an example illustrative embodiment of communication flow between storage node shown in FIG. 1 and a data repository unit (DRU) controller, and further between a probe controller, in accordance with an illustrative embodiment of the present disclosure.

FIG. 6 is a flow diagram showing an illustrative embodiment of communication flow between storage node 106 and the DRU 122 controller, as well as between storage node 106 and the probe controller 124. The probe controller 124 transmits captured data streams 630 and associated registration information 632 to the probe manager 109. The registration information can include an identification of the stream, an identification of the probe 120 that transmitted the stream, and a storage policy associated with the identified data stream. The storage policy includes a retention policy that indicates a time period for which the associated data stream is designated to be stored. The probe controller 124 can further transmit usage data 634 to the probe manager. The usage data 634 includes a number of data streams being transmitted, data rates associated with the data streams, and transmission capacity. The transmission capacity indicates a number of data streams that the associated probe 120 can transmit and data rates at which the associated data streams can be transmitted.

The probe manager 109 can transmit notifications 636 or control messages 638 to the probe controller 124. Such notifications 636 or control messages 638 can be sent when a decision has been made to perform a corrective action. For example, a decision may be made to perform a corrective action when a data repository unit 114 that was selected to store a data stream does not have a current or predicted capacity to receive and store the data stream, such as due to an actual or predicted change of circumstances. The probe controller 124 can respond to the instructions by implementing the instructed corrective actions.

A notification 636 can include an identification of the data stream that is being affected by the corrective action, and/or indicate an amount of time by which the time period of the retention policy is being adjusted. In this way, the probe 120 will be informed if the identified data stream is not being stored (e.g., the time period was adjusted to zero) or the identified data stream is being stored for shorter than expected based on its original retention policy.

Control messages 638 can instruct the identified probe 120 to adjust (reduce or increase) its throughput (data rate and/or quantity of data streams being sent) to temporarily reduce output or discontinue outputting data streams to the plurality of data repository units 114. The control messages 648 can specify, for example, the data rate to be used, the number of streams that can be output, and the duration of the reduction or discontinuation. The probe manager 109 receives the control messages 638 and can control the probe 120 to perform according to the instructions.

The probe manager 109 can use the usage data 634 to determine suitable reductions for one or more probes 120 in order to minimize the impact on a particular probe 120. The usage data 634 can be processed to determine, for example, whether the probes 120 are operating at full or less than full capacity, to determine whether one or more probes 120 suddenly or gradually changed operating capacity, to determine if immediate action needs to be taken, to predict data flow and when a future action may need to be taken, and recognize trends in incoming data, such as in correlation with other factors, such as time of the day, week, month, year, etc.

The DRU manager 111 can transmit instructions 640 to adjust a retention policy associated one or more data streams, such as to decrease a time period for storing one or more selected data streams, or to withhold from storing the selected data stream(s) in the data repository units 114.

The DRU controller 122 can transmit information to the DRU manager 111, such as storage capacity information. The storage capacity information can include, for example, bandwidth capacity information 642 representing bandwidth capacity of the associated data repository unit 114 in real time, and/or storage depth capacity information 644 representing storage depth capacity in real time of the associated data repository units. The bandwidth capacity information 642 and storage depth capacity information 644 can indicate an increase in bandwidth capacity and/or storage depth capacity, such as when additional DRUs 114 are added, additional disks are added to a DRU 144, and/or data is removed from storage. Similarly, the bandwidth capacity information 642 and storage depth capacity information 644 can indicate a decrease in bandwidth capacity and/or storage depth capacity in response to an actual or predicted data influx. The bandwidth capacity information 642 and storage depth capacity information 644 can indicate overall increases or decreases in bandwidth and/or depth capacity as well as localized increases or decreases that identify a location and duration of a determined or predicted change in bandwidth and/or depth capacity. For example, when DRUs 114 are added, overall bandwidth capacity and storage depth capacity can be increased linearly and the added DRUs 114 can be utilized, e.g., based on their respective locations (e.g., addresses).

In addition, the DRU controller 122 can transmit an alert 646 indicating that the data repository unit's 114 storage capacity is insufficient for storing incoming data based on a rate of at least one data stream assigned to be stored by the data repository unit 114. An alert 646 can be issued, for example, when the data repository unit 114 recognizes the occurrence of a spike in incoming data that will overwhelm its ability to store the incoming data. If immediate action is not taken, data streams will not be stored and will be dropped. This is particularly undesirable when a data stream is dropped without notification, such as to the probe 120 that sent the data stream to the storage network 100. The alert 646 can help to mitigate storage difficulties, with a key objective being to avoid dropping data streams without any notification that an identified data stream was dropped.

The stream controller 110 can distribute the various data streams across the different disk arrays of the different DRUs 114 in a parallel fashion to take advantage of increased bandwidth capacity. The stream controller 110 can monitor dynamic changes to the performance of the respective arrays and DRUs 114, such as by monitoring input/output (I/O) rates, queue depths, etc., to assure that one array or DRU 114 is not being overloaded and redirect the data streams accordingly. Likewise, to take advantage of this added bandwidth, the stream controller 110 can distribute the data streams across the DRUs 114 such that the writing is performed in parallel. The stream controller 110 can monitor dynamic changes associated with the various DRUs 114, such as CPU utilization, performance changes of its disk arrays, etc., and redirect storage streams accordingly.

The stream controller 110 can further determine which DRU each data stream should be directed towards based on the available disk space on each storage unit for long term storage. The determination of which DRU to use can be based on dynamic information, such as addition of DRUs 114 or disks, unavailability of a DRU 114 or disk due to malfunction or consumption of available storage space, and/or availability of a DRU 114 or disk due to removal of stored data based on expiration of a time period of a retention policy associated with the data.

Since the master controller 107, including the probe manager 109 and DRU manager 111, can use a distributed implementation, the decisions and actions performed by the probe manager 109 and DRU manager 111 can be performed by any combination of one or more of the probe managers 109 or DRU managers 111 included in the master controller 107. Such decisions can be made using cooperation between the probe manager 109, the DRU manager 111, and/or other components of the master controller 107.

Figure 7:
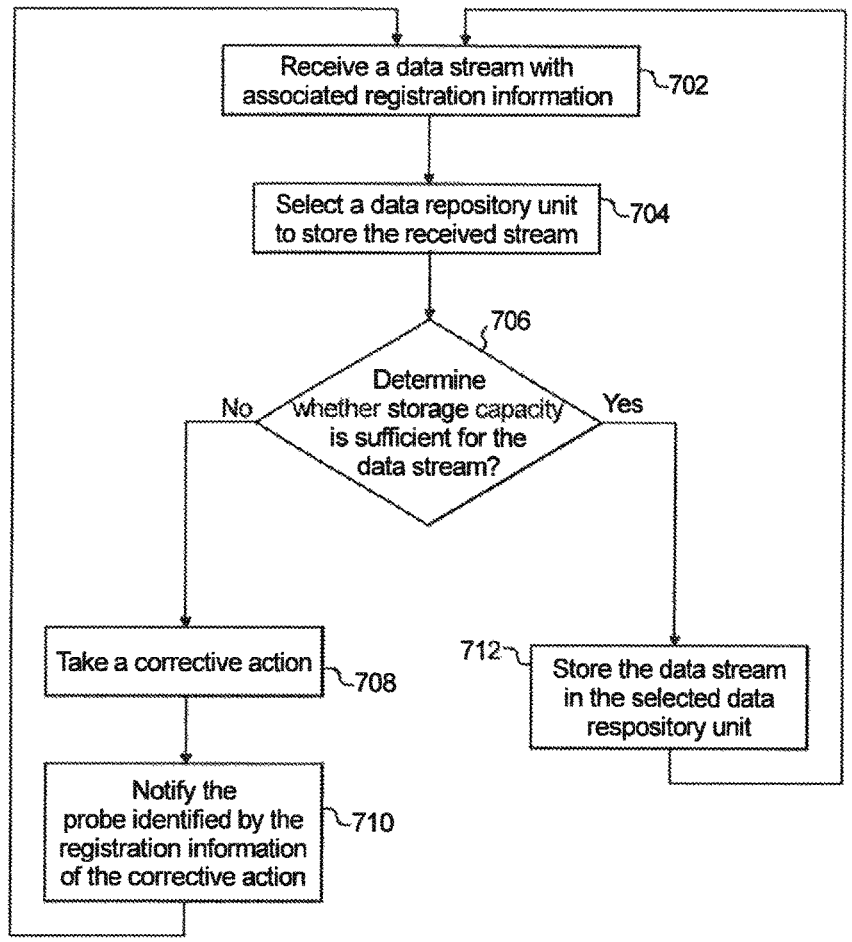
FIG. 7 is a flowchart of operational steps of a master controller shown in FIG. 1, in accordance with an illustrative embodiment of the present disclosure.

FIG. 7 is a flowchart of operational steps of the master controller 107 of FIG. 1, in accordance with an illustrative embodiment of the present disclosure. The master controller 107 may generally include distributed software modules or applications that monitor and predict resource utilization and perform corrective actions in response to predicting and/or detecting any degradation of service.

At 702, a data stream with associated registration information is received. The registration information includes identification of the data stream and identification of the associated probe 120 that output the data stream. At 704, a data repository unit 114 is selected to store the received stream. The selection can be made in real time based on a current or predicted capacity of the available data repository units 114 to receive and store data. At 706, the handling of the data stream is monitored to determine whether storage capacity is sufficient for the data stream, such as in response to a change in the current or predicted storage capacity of the selected data repository unit 114 to receive and store data. Changes in the bandwidth capacity 642 or depth capacity 644, or an alert 646 transmitted by the selected DRU 114 could indicate such a change in storage capacity.

If it was determined at operation 706 that the current or predicted storage capacity is insufficient (706, no branch), then at 708 a corrective action is taken. Examples of corrective actions include instructing the identified probe 120 to temporarily discontinue outputting data streams to the data repository units 114, withholding from storing a selected data stream (the received data stream or a different data stream, such as to make room for the received data stream) in any of the data repository units 114, and selecting an alternative data repository unit 114 in which to store the data stream.

The corrective action or the need to take the corrective action can be determined based on a prediction that the storage capacity will not be sufficient, such as for one or more particular data repository units 114. The prediction can be based on trends in the current real time data, trends in historical data, or retention policies associated with the stored data streams. For example, the current real time data may correlate to similar factors as historical trends.

At 710, the probe 120 identified by the registration information is provided with a notification 636 and/or control messages 638. Notification 636 can notify the probe 120 of the corrective action. For example, notification 636 can indicate to the associated probe 120 the identity of the data stream that was selected for adjusting its retention policy, an amount of time by which the retention policy is adjusted, and/or an identity of the data stream selected to be withheld from being stored. The control messages 638 can instruct the probe 120 to reduce its throughput.

If it was determined at operation 706 that the current or predicted storage capacity is sufficient (706, yes branch), then at 712 the data stream is stored in the selected data repository unit 114. If the current or predicted storage capacity indicates that additional capacity is available, the control messages 638 can instruct the probe 120 to increase its throughput. Following operations 710 or 712, the method continues iteratively at operation 702.

In summary, various embodiments of the present disclosure describe a novel storage management approach that offers a cost-effective network storage solution capable of receiving, processing and storing large amounts of data without adding a significant overhead. Advantageously, the disclosed data management platform employs an elaborate QoSt supporting framework, which is based primarily on processing rules that are consistent with the full set of data attributes defined by the interface. In another aspect, a high flexibility and robustness of data storage system is provided to users through highly flexible software modules that function in an efficient way that is transparent to an application using the disclosed storage network. Various embodiments of the present disclosure introduce a new approach aimed at shifting substantially all QoSt responsibilities to the storage network framework, which is enabled to provide optimal and consistent QoSt support.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 8:
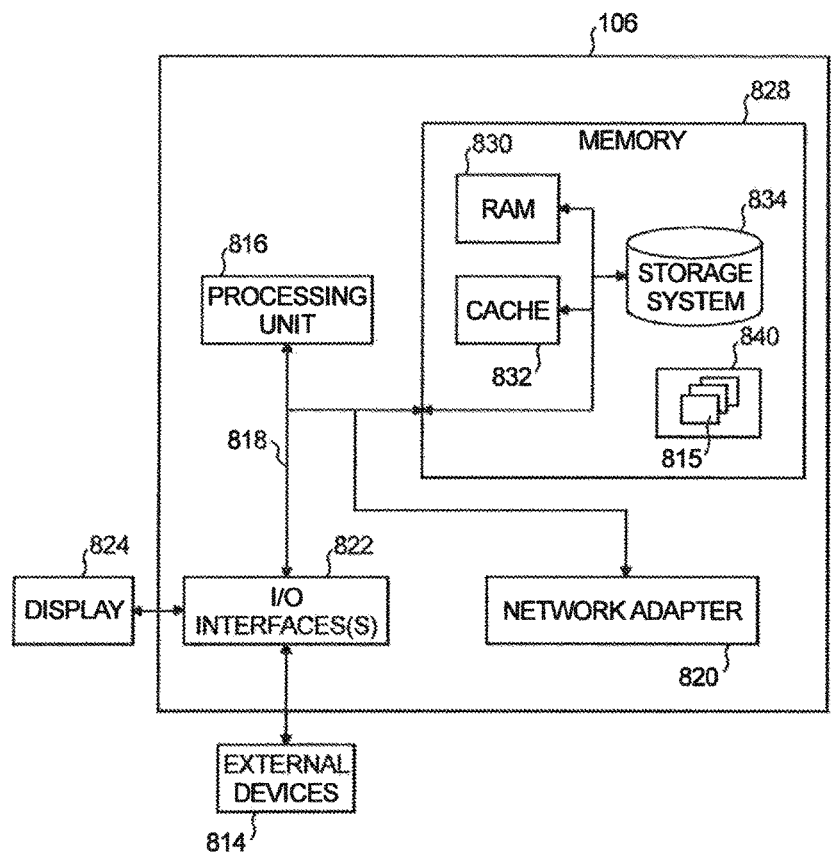
FIG. 8 is a block diagram illustrating a typical storage node that may be employed to implement some or all processing functionality described herein, according to some embodiments.

Embodiments of QoSt based storage management framework may be implemented or executed by storage nodes comprising one or more computer systems. One such storage node 106 is illustrated in FIG. 8. In various embodiments, storage node 106 may be a server, a mainframe computer system, a workstation, a network computer, a desktop computer, a laptop, or the like.

Storage node 106 is only one example of a suitable system and is not intended to suggest any limitation as to the scope of use or functionality of embodiments of the disclosure described herein. Regardless, storage node 106 is capable of being implemented and/or performing any of the functionality set forth hereinabove.

Storage node 106 may be described in the general context of computer system-executable instructions, such as program modules, being executed by a computer system. Generally, program modules may include routines, programs, objects, components, logic, data structures, and so on that perform particular tasks or implement particular abstract data types. Storage node 106 may be practiced in distributed data processing environments where tasks are performed by remote processing devices that are linked through a communications network. In a distributed data processing environment, program modules may be located in both local and remote computer system storage media including memory storage devices.

Storage node 106 is shown in FIG. 8 in the form of a general-purpose computing device. The components of storage node 106 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Storage node 106 typically includes a variety of computer system readable media. Such media may be any available media that is accessible by storage node 106, and it includes both volatile and non-volatile media, removable and non-removable media.

System memory 828 can include computer system readable media in the form of volatile memory, such as random access memory (RAM) 830 and/or cache memory 832. Storage node 106 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815, such as storage manager 108, stream controller 110 and stream processor 112, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 815 generally carry out the functions and/or methodologies of embodiments of the disclosure as described herein.

Storage node 106 may also communicate with one or more external devices 814 such as a keyboard, a pointing device, a display 824, etc.; one or more devices that enable a user to interact with storage node 106; and/or any devices (e.g., network card, modem, etc.) that enable storage node 106 to communicate with one or more other computing devices. Such communication can occur via Input/Output (I/O) interfaces 822. Still yet, storage node 106 can communicate with one or more networks such as a local area network (LAN), a general wide area network (WAN), and/or a public network (e.g., the Internet) via network adapter 820. As depicted, network adapter 820 communicates with the other components of storage node 106 via bus 818. It should be understood that although not shown, other hardware and/or software components could be used in conjunction with storage node 106. Examples, include, but are not limited to: microcode, device drivers, redundant processing units, external disk drive arrays, RAID systems, tape drives, and data archival storage systems, etc.

DRU controller 222 and probe controller 224 can similarly include components shown in FIG. 8, such as processing unit 816, memory 828, and I/O interface 822.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A master controller device for supervising data stream storage, comprising:
    a plurality of storage node units;
    at least one Data Repository Unit controller device;
    at least one probe control unit; and
    at least one processing device, the processing device configured to execute programmable software instructions to perform operations including:
        communicating with at least one probe that captures network data and outputs the captured network data as a plurality of data streams;
        receiving from the at least one probe registration data associated with respective data streams, the registration data including identification of the associated probes that output the respective data streams;
        selecting at least one data repository unit of the plurality of data repository units to store the first data stream in real time based on a capacity of the plurality of data repository units to receive and store data;
        determining that capacity is not sufficient for the data stream in response to a change in the capacity of the plurality of data repository units to receive and store data;
        determining a corrective action in response to the determination that the capacity is not sufficient; and
        notifying the probe identified in association with the first data stream about the corrective action and implementing the corrective action in the identified probe.

2. The master controller of claim 1, wherein
    the registration data associated with the respective data streams include a retention policy, the retention policy representing a time period that the respective data streams are designated to be stored, and
    wherein the at least one processing device further executes programmable software instructions to perform operations for:
        receiving bandwidth capacity information representing bandwidth capacity in real time of the plurality of data repository units of a data storage system; and
        receiving storage depth capacity information representing storage depth capacity in real time of the plurality of data repository units; and
        determining the capacity to receive and store data based on the bandwidth capacity information and the storage depth capacity.

3. The master controller of claim 2, wherein the corrective action includes instructing a selected data repository unit to adjust a retention policy associated with a selected data stream of the plurality of data streams.

4. The master controller of claim 3, wherein the notification to the identified probe identifies the data stream that was selected for adjustment of its associated retention policy.

5. The master controller of claim 3, wherein the notification to the identified probe indicates an amount by which the retention policy is adjusted.

6. The master controller of claim 1, wherein corrective action includes instructing the identified probe to temporarily discontinue outputting data streams to the plurality of data repository units.

7. The master controller of claim 1, wherein the corrective action includes withholding from storing the data stream in the plurality of data repository units.

8. The master controller of claim 7, wherein the notification to the identified probe identifies the data stream that is withheld from being stored.

9. The master controller of claim 1, wherein the at least one processing device further executes programmable software instructions to perform operations to:
    receive usage status data from the respective at least one probe, the usage status data indicating at least one of a number of streams available to be used by the corresponding probe, an associated data rate of the respective streams available, a number of streams currently being used by the corresponding probe, and an associated data rate at which the respective streams are being operated, and wherein at least one of insufficient capacity and the corrective action is determined based on the usage status data.

10. The master controller of claim 1, wherein the at least one processing device further executes programmable software instructions to perform operations to receive an alert from a data repository unit of the plurality of data repository units, the alert indicating that the data repository unit's storage capacity is insufficient for storing incoming data based on a rate of at least one data stream assigned to be stored by the data repository unit, and at least one of insufficient capacity and the corrective action is determined based on the alert received.

11. The master controller of claim 1, wherein the corrective action includes selecting an alternative data repository unit of the plurality of data repository units for storage of the data stream.

12. The master controller of claim 1, wherein the master controller further includes second programmable software instructions executed by at least one second processing device of the at least one probe, the second programmable software instructions transmitting the registration data associated with respective data streams that are output by the at least one probe.

13. The master controller of claim 12, wherein the second programmable instructions are further executed by the at least one second processing device of the at least one probe to receive and implement the corrective action.

14. The master controller of claim 1, wherein the master controller further includes third programmable software instructions executed by at least one third processing device of the plurality of data repository units, the third programmable software instructions determining and transmitting the bandwidth capacity information and the storage depth capacity information associated with the plurality of data repository units.

15. The master c of claim 14, wherein the third programmable software instructions receive and implement the corrective action.

16. The master controller of claim 1, wherein at least one of determining that storage capacity is not sufficient and determining the corrective action is performed based on a prediction that the storage capacity of at least one particular data repository unit will not be sufficient.

17. A computer-implemented method for supervising data stream storage, the method comprising:
providing a master controller consisting of:
at least one storage node unit;
at least one Data Repository Unit controller device;
at least one probe control unit;
communicating the master controller with at least one probe that captures network data and outputs the captured network data as a plurality of data streams;
receiving in the master controller from the at least one probe registration data associated with respective data streams, the registration data including identification of the associated probes that output the respective data streams;
selecting at least one data repository unit of the plurality of data repository units to store the first data stream in real time based on a storage capacity of the plurality of data repository units to receive and store data;
determining that storage capacity is not sufficient for the data stream in response to a change in the storage capacity of the plurality of data repository units to receive and store data;
determining a corrective action in response to the determination that the storage capacity is not sufficient; and
notifying the probe identified in association with the first data stream about the corrective action and implementing the corrective action in the identified probe.

18. The method of claim 17, wherein the corrective action includes instructing the identified probe to temporarily discontinue outputting data streams to the plurality of data repository units.

19. A method for supervising data stream storage, the method comprising:
providing a master controller including:
at least one storage node unit;
at least one Data Repository Unit controller device;
at least one probe control unit;
capturing network data in the master controller unit;
outputting the network data captured as a plurality of data streams to a network storage system having a plurality of data repository units, the output network data having associated registration data that identifies the respective data streams; and
receiving in real time notification of a corrective action in response to a determination that storage capacity associated with a selected at least one data repository unit of the plurality of data repository units is no longer sufficient to store a first data stream of the plurality of data streams, the determination being based on a change in real time storage capacity of the plurality of data repository units to receive and store data,
wherein the notification identifies the data stream affected by the corrective action causing the corrective action to be implemented in an associated probe.

20. The method of claim 19, wherein the notification includes instructions to perform the corrective action, the method further comprising implementing the corrective action in accordance with the instructions.

* * * * *